United States Patent [19]
Nyhus

[11] Patent Number: 6,082,968
[45] Date of Patent: Jul. 4, 2000

[54] CENTRIFUGALLY ACTIVATED VARIABLE DAMPER ASSEMBLY

[75] Inventor: Dan Nyhus, Gilbert, Ariz.

[73] Assignee: The Boeing Company, Seattle, Wash.

[21] Appl. No.: 09/201,435

[22] Filed: Nov. 30, 1998

[51] Int. Cl.[7] .................................................. B64C 27/42
[52] U.S. Cl. .............................. 416/148; 416/45; 416/46; 416/51; 416/52; 416/107; 416/140; 91/183; 244/7 R; 244/17.13
[58] Field of Search .................................. 416/45, 46, 48, 416/51, 52, 106, 107, 148, 153, 140, 500; 91/183; 244/6, 7 R, 7 A, 17.11, 17.13, 75 A

[56] References Cited

U.S. PATENT DOCUMENTS

| | | |
|---|---|---|
| 3,582,021 | 6/1971 | Pender . |
| 3,762,667 | 10/1973 | Pender . |
| 4,105,365 | 8/1978 | Ferris et al. ............................. 416/107 |
| 4,127,244 | 11/1978 | Pender . |
| 4,431,375 | 2/1984 | Carter, Jr. et al. .................. 416/132 B |
| 4,664,410 | 5/1987 | Richard ................................... 280/714 |
| 4,966,390 | 10/1990 | Lund et al. ............................. 280/772 |
| 5,107,969 | 4/1992 | Klein et al. ............................. 188/299 |
| 5,454,530 | 10/1995 | Rutherford . |

*Primary Examiner*—Edward K. Look
*Assistant Examiner*—Matthew T. Shanley
*Attorney, Agent, or Firm*—Carlos M. Herrera

[57] ABSTRACT

A centrifugally activated variable damper assembly for a stopped-rotor aircraft is disclosed for adjusting dampening level of teetering motions produced by the rotors during the in-flight conversion process from rotary-wing to fixed-wing flight, or vise versa. The assembly includes a damper valve responsive to centrifugal forces produced by rotational speed of the aircraft rotor. The assembly also includes dampers within the rotor system that operate at variable damping levels in response to centrifugal forces acting upon the damper valve.

20 Claims, 3 Drawing Sheets

CENTRIFUGALLY ACTIVATED VARIABLE DAMPER ASSEMBLY

BACKGROUND OF THE INVENTION

1. Field of the Invention

This invention relates to a centrifugally activated variable damper assembly. More particularly, this invention relates to a centrifugally activated variable damper assembly to be used preferably in connection with a stopped-rotor aircraft (see, U.S. Pat. No. 5,454,530) to provide smooth transition during the conversion process from rotary wing to fixed-wing flight, or vise versa. With greatest particularity, the invention relates to a centrifugally activated variable damper and associated linkages to adjust the damping level of the rotor blades and hub about the teetering connection to the mast to be produced depending upon the flight configuration.

2. Background Information

Various types of aerial vehicles have been proposed which would be capable of vertical takeoff and landing as well as flying like a fixed-wing aircraft, such as the stowed-rotor and X-wing. These concepts may be different in design, yet attempt to achieve similar operational goals of vertical takeoff and landing, and high-speed forward flight.

The concept known as the stowed-rotor behaves like a conventional helicopter for vertical takeoff and landing. For high speed forward flight the rotors are stopped and stowed out of the way of the air stream to reduce drag, while a set of conventional fixed-wing airfoils assume primary lift. U.S. Pat. No. 4,127,244 to Pender (1978) show the complexity involved in stopping and folding the rotors. Similar aircraft require the additional weight of a fixed-wing, as well as the complexity and aerodynamic drag of a stowed-rotor.

Other concepts of the aforesaid aircraft such as the X-wing use a rotor for vertical and translational flight. In the helicopter mode, the rotors rotate to provide for verticals take off and landing. For flight in the fixed-wing mode, the rotor is eventually stopped and locked to the body of the aircraft.

The complexity and number of mechanisms associated with a main rotor structure used in helicopter mode flight, and the differing stiffness requirements of the rotor relative to the mast of the aircraft in helicopter and fixed-wing flight mode, greatly complicates the challenge of successfully transitioning between rotary-wing and fixed-wing flight, and vise versa.

For the purpose of this disclosure, further discussion will be based on a two-bladed teetering rotor with a rigid hub between the two blades. Accordingly, in order to provide acceptable dynamic loads and gust sensitivity while in helicopter mode, the rotor blades and hub need to be free to teeter about the connection to the mast with relatively low stiffness. Yet to attain high speed flight while in fixed-wing mode, the hub-to-mast stiffness must be orders of magnitude higher in fixed-wing mode than the low stiffness required for helicopter mode. Furthermore, during the conversion process from helicopter mode to fixed-wing mode, the blades and hub may have a tendency to teeter due to high forward velocity of the aircraft and gusts encountered during flight. A sudden increase in stiffness while the rotor is teetering causes high loads in the rotor system due to the abrupt stopping of the teetering motion.

It is seen then that it would be desirable to have a variable damper assembly in the rotor system of a stopped-rotor aircraft to adjust the damping level to be produced depending upon the flight configuration of the aircraft as the aircraft transitions from rotary-wing to fixed-wing flight, or vise versa. The present invention incorporates a centrifugally activated damper assembly for use in a stopped-rotor aircraft to dampen the teetering motions of the rotor blades depending upon the centrifugal forces acting upon the assembly produced by the rotation of the rotor system as a function of the aircraft flight configuration.

SUMMARY OF THE INVENTION

The present invention provides a centrifugally activated variable damper assembly which finds particular utility in a stopped-rotor aircraft including a circulating rotor/wing blade structure, which serves dual functions in different flight modes. The centrifugally activated variable damper assembly is utilized to dampen rotor blade teetering motions produced during flight conversion.

As will be set forth in greater detail in the description of the preferred embodiment, flapping forces applied to the rotor hub by the rotor blades causing the hub to teeter about the teetering hinge are transmitted through the centrifugally activated damper assembly to the rotor shaft and to the airframe. Resistance to the teetering motion is controlled by the centrifugally activated damper assembly as a result of the rotational speed of the rotor shaft so as to allow effective flight modes and transition thereof.

BRIEF DESCRIPTION OF THE DRAWINGS

The preferred embodiment of the centrifugally activated damper assembly built in accordance with the present invention is disclosed in the following detailed description. The description makes reference to the accompanying drawings in which.

DESCRIPTION OF A PREFERRED EMBODIMENT

Figure 1:
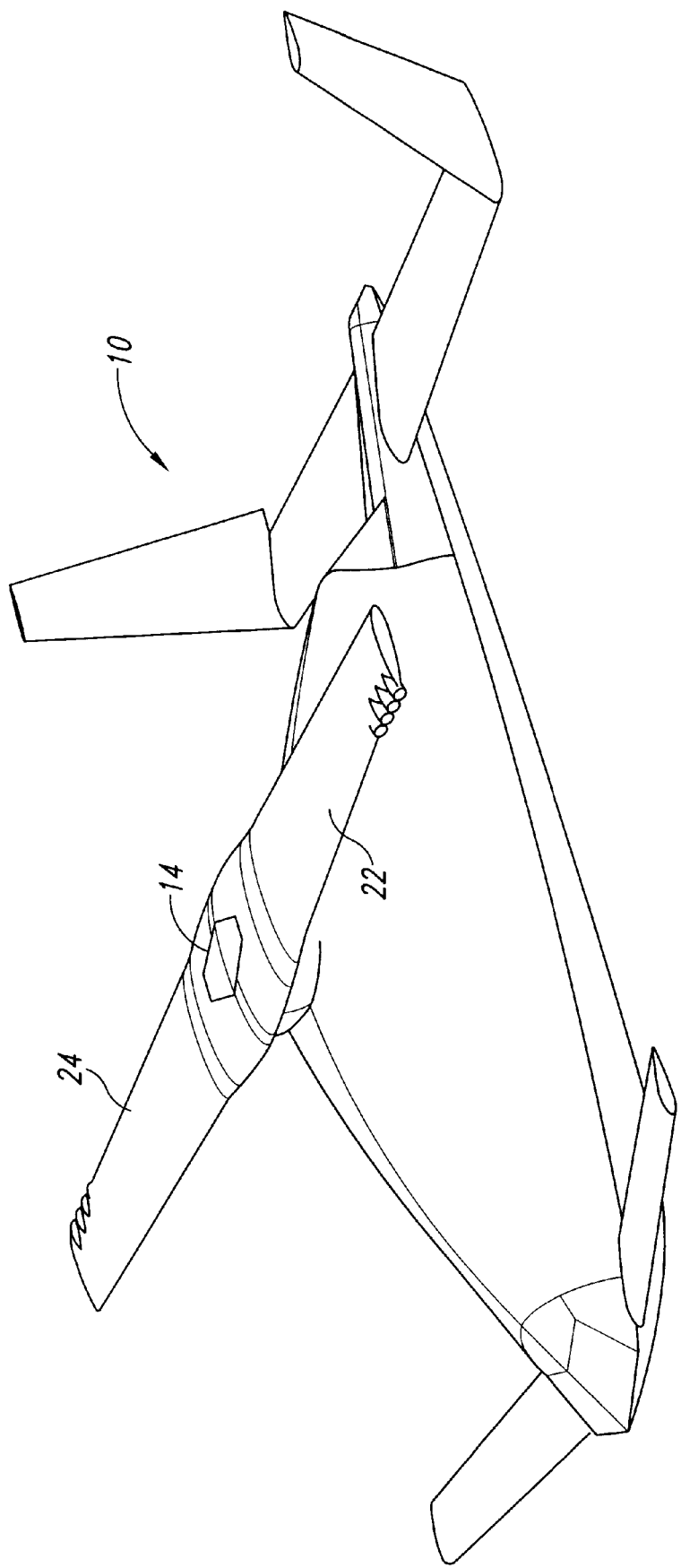
FIG. 1 is a perspective diagrammatic view of a stopped-rotor aircraft provided with the centrifugally activated variable damper assembly embodying the principles of the present invention.
Figure 2:
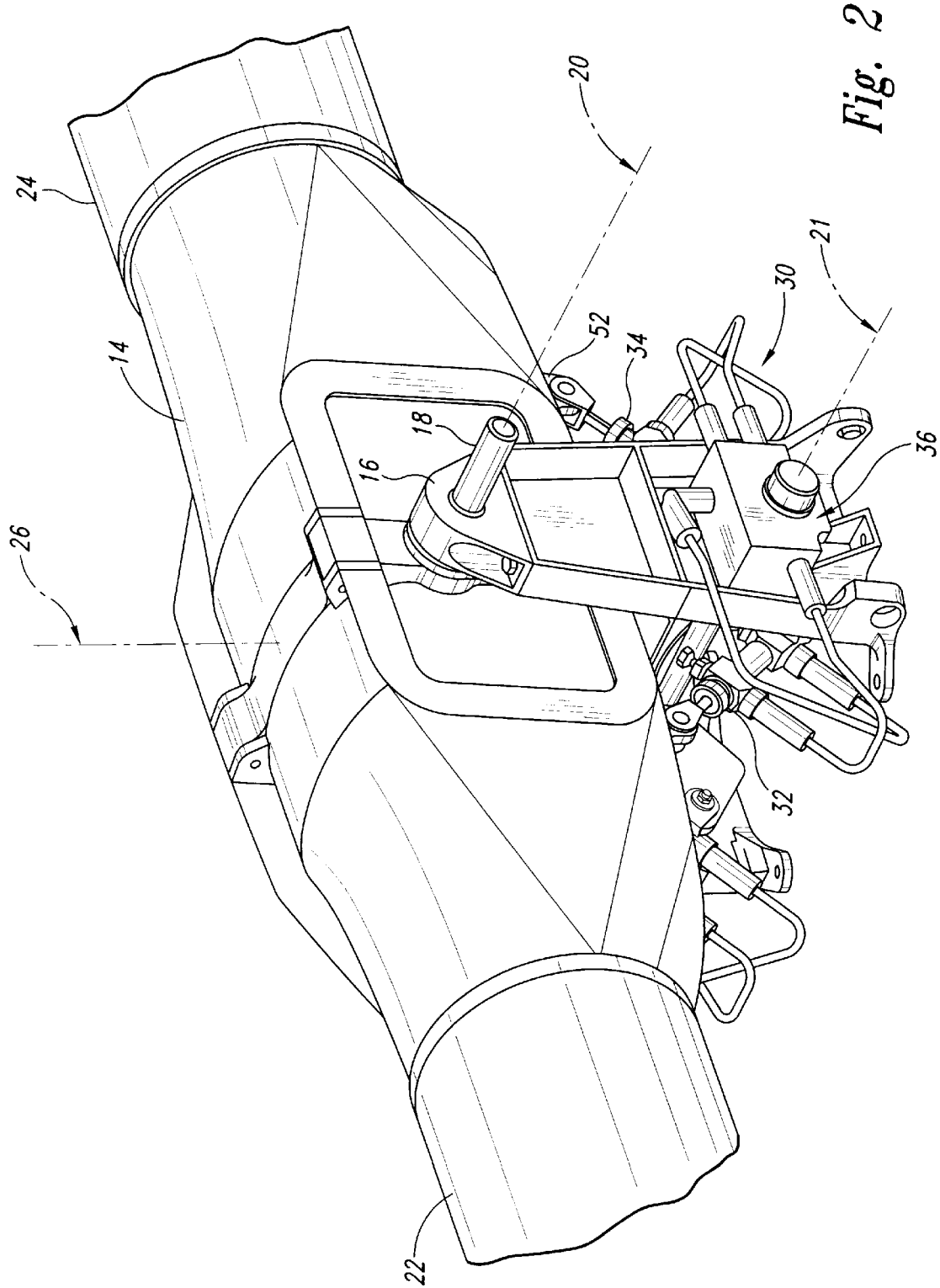
FIG. 2 is a perspective view of the centrifugally activated variable damper assembly in accordance with the present invention installed on the rotor hub of the preferred rotor structure of an aircraft.

Referring now to FIG. 1 and FIG. 2, wherein like reference characters represent like elements, there is illustrated a dual mode aircraft or rotorcraft 10 capable of flight in both rotating rotor and fixed-wing configurations. The aircraft 10 includes a fuselage 12, on which is rotatably mounted a rotor shaft (not shown), including a yoke 16. Rotor hub 14 is pivotably connected to yoke 16 through teetering hinge 18 which defines teetering axis 20. Rotor blades 22 and 24 are connected by bearings (not shown) to rotor hub 14 to form a two bladed rotor. The bearings permit changing of the pitch of each rotor blade 22 and 24.

In helicopter mode, the rotor blades 22 and 24 rotate through a substantially circular planar section. The rotor blade controls consists of cyclic and collective pitch controllers (not shown) to attain the desired direction of flight. With collective pitch control, the pitch of each rotor blade 22 and 24 is changed simultaneously. Cyclic pitch control varies rotor blade pitch during rotation so that the rotor blade pitch is reduced on one side of rotation and increased on the other side of rotation. While the rotor blades 22 and 24 go through these cyclic pitch changes, they also go through cyclic flapping or teetering changes, which cause tilting of the rotor hub 14 about teetering axis 20. The tilting of the rotor hub 14 provides aircraft control by tilting the thrust vector of the rotor blades 22 and 24 to provide a horizontal component and moment, thus tipping the aircraft in the desired direction of flight. This horizontal thrust component causes the aircraft to fly in the desired direction, such as sidewardly, fowardly, or rearwardly.

Referring to FIG. 2, an exemplary embodiment of a centriftigally variable activated damper assembly is designated generally by reference number 30 and includes two similar hydraulic piston dampers 32 and 34 and damper valve assembly 36. The hydraulic piston dampers 32 and 34 are pivotally connected at their lower ends to the yoke 16 of the rotor shaft with rotation axis 26. At their upper ends, the two hydraulic piston dampers 32 and 34 are pivotally connected to lugs 52 on rotor hub 14. It will be seen below that the two hydraulic piston dampers 32 and 34 operate to effect stiffness control of the rotor hub 14 and hence the rotor blades 22 and 24.

Figure 3:
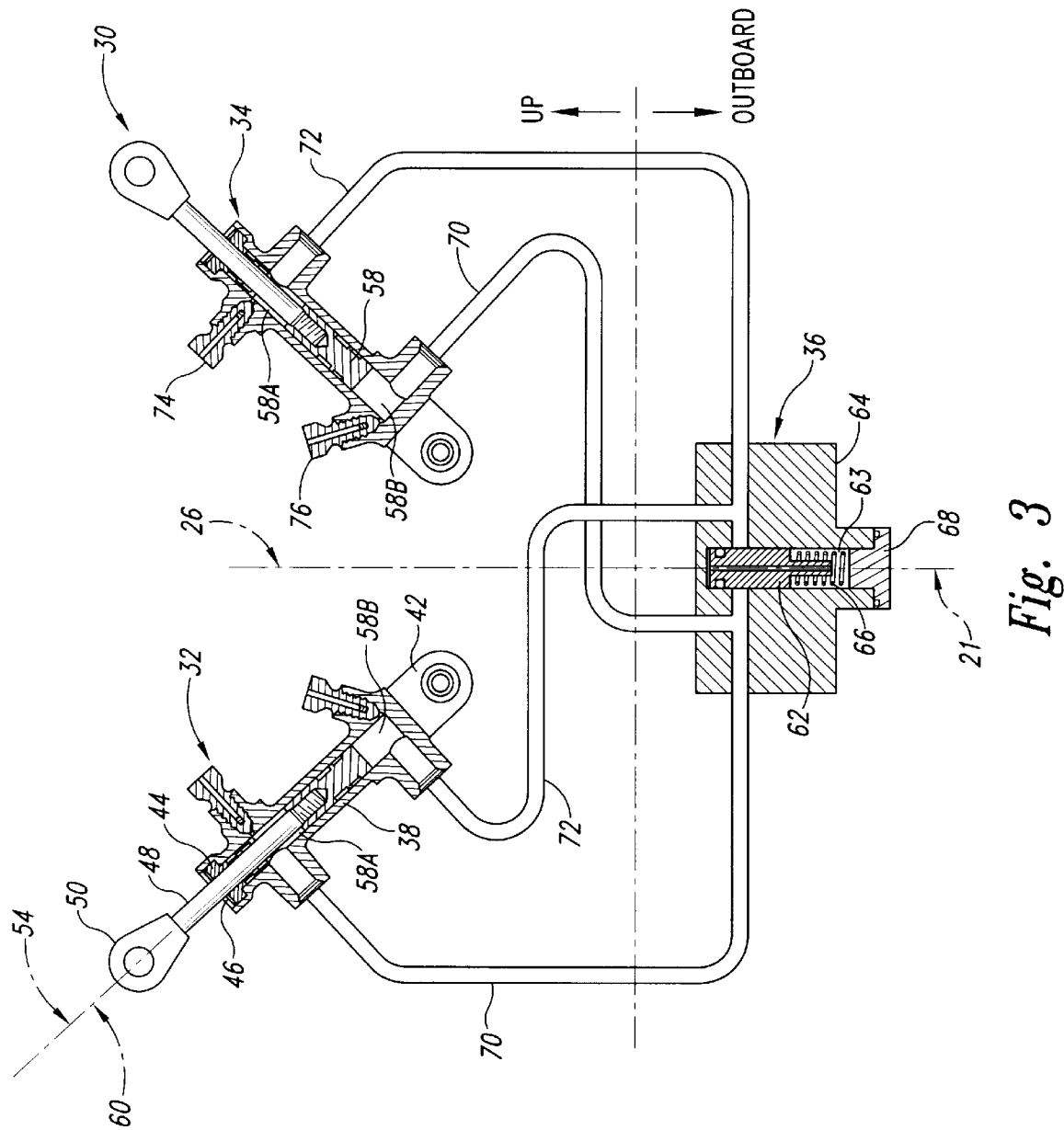
FIG. 3 is a diagrammatic view of the centrifugally activated variable damper assembly in accordance with the present invention.

The hydraulic piston dampers 32 and 34 are similar and for case in description, like reference numerals will be used to identify corresponding like elements of the two hydraulic dampers. As best seen in FIG. 3, hydraulic piston dampers 32 and 34 include a generally cylindrical housing 38 having at one end thereof a clevis 42 by which the housing 38 may be pivotably attached to a mounting structure (not shown) on yoke 16. The end of the housing 38 opposite the clevis 42 is defined by an end cap 44 having a central opening 46 through which a reciprocating piston rod 48 extends. The reciprocating piston rod 48 terminates external to the housing 38 in a clevis end 50 for pivotable attachment to a lug 52 (see, FIG. 2) on rotor hub 14. The reciprocating piston rod 48 terminates internal to the housing 38 in an attachment to the damper piston 58.

As shown most clearly in FIG. 3, the hydraulic piston dampers 32 and 34 are operatively connected to a centrifugal damper valve assembly 36 which selects the operation mode of the hydraulic piston dampers 32 and 34 on the basis of the rotational speed of the rotor shaft of the aircraft 10. The centrifugal damper valve assembly 36 is operatively connected to the housing 38 of hydraulic piston dampers 32 and 34 in a manner to dampen the reciprocating movement of the reciprocating piston rod 48 along the path 54. Damper piston 58 is of a conventional configuration for sliding movement within the housing 38 along axis 60 coincident with path 54. At each end of damper piston 58 are hydraulic chambers 58A and 58B formed by the cylindrical inner face of housing 38 in hydraulic piston dampers 32 and 34. A pair of bleed valves 74 and 76 are provided in chambers 58A and 58B respectively for removing trapped air in the fluid circuit during assembly and servicing of the system. A pressure relief valve (not shown) and an accumulator (not shown) accommodate expansion and contraction of the viscous damping fluid due to changes in temperature.

Damper valve assembly 36 includes a centrifugal activated valve 62 which slides within housing 64 along path 21 perpendicular to axis 26. A helical compression spring 66 is disposed in an operative manner between centrifugal activated valve 62 and retainer cap 68. The damper valve assembly 36 and hydraulic piston dampers 32 and 34 are disposed in a fluid circuit including a pair of conduits 70 and 72 which act as fluid pathways for communicating fluid pressure between the chambers formed in housing 38 of the hydraulic piston dampers 32 and 34.

The operation of the centrifugal activated damper assembly having the aforesaid constitution will hereinafter be explained.

As the rotor shaft of the aircraft 10 rotates about axis 26, it rotates yoke 16, rotor hub 14, rotor blades 22 and 24, dampers 32 and 34, and centrifugal damper valve assembly 36. The amount of centrifugal force acting upon the centrifugal damper valve assembly 36 depends on the rotational speed of the rotor shaft. Accordingly, when the speed of revolution of the rotor shaft increases, the centrifuigal activated valve 62 moves along path 21 in a direction counter to the biasing force of the spring 66, i.e., outwardly relative to the rotational axis 26 of the aircraft rotor shaft. Thus, during the rotation of the rotor shaft the centrifugal activated damper valve 62 travels to the open position to effect communication between conduits 70 and 72 and chambers 58A and 58B. This allows the reciprocating piston rod 48 of hydraulic piston dampers 32 and 34 to travel freely within housing 38 and, consequently, allowing the rotor blades 22 and 24 to freely teeter about the connection to the rotor shaft with relatively low stiffness to allow the teetering, degree of freedom while in helicopter mode.

As the rotational speed of the rotor shaft is reduced for conversion to fixed-wing mode of aircraft 10, the centrifugal activated damper valve 62 is biased by spring 66 eventually reaching the closed position thereby greatly restricting or preventing hydraulic communication between conduits 70 and 72. Because the teetering motion of the hub 14 causes damper 32 to contract while it causes damper 34 to extend, and vise versa, as the hydraulic communication between conduits 70 and 72 is increasingly restricted, the teetering motion of the rotor hub 14 and therefore blades 22 and 24 is also increasingly restricted. For example, in the closed position, the centrifugal activated valve 62 maintains the flow of hydraulic fluid within conduit 70 so as to allow direct hydraulic communication between chamber 58A of damper 32 and the corresponding chamber 58B of damper 34. Similarly, fluid pressure between chamber 58B of damper 32 and 58A of damper 34 is attained via conduit 72. In the fixed-wing mode then, as shown in FIG. 3, the centrifugal activated damper valve 62 is fully closed and causes dampers 32 and 34 to be hydraulicly locked, effectively increasing the stiffness of the hydraulic dampers and, consequently, the teetering motion of rotor blades 22 and 24.

It is to be understood that the present invention is not limited to the particular arrangement and embodiments of parts disclosed and illustrated herein. It is intended that all matter contained in the foregoing description or shown in the accompanying drawing shall be interpreted as illustrative and not limiting. Other improvements, modifications and embodiments will become apparent to one of ordinary skill in the art upon review of this disclosure. Such improvements, modifications and embodiments are considered to be within the scope of this invention. Therefore, the present invention embraces all such modified forms thereof as come within the scope of the following claims.

What is claimed is:

1. A centrifugally activated damper assembly, comprising:
   a. first and second hydraulic dampers, each damper having respective first and second hydraulic chambers; and
   b. a centrifugal activated valve operatively connecting said respective first and second dampers so as to affect movement of said first and second dampers in response to rotational forces upon said centrifugal activated valve,
      wherein said centrifugal activated valve is capable of selectively interconnecting each of the hydraulic chambers of said first hydraulic damper with each of the hydraulic chambers of said second hydraulic damper.

2. A centrifugally activated damper assembly as in claim 1, wherein said centrifugal activated valve further comprises a first fluid pathway connected between said first hydraulic chamber of said first damper and said second hydraulic chamber of said second damper.

3. A centrifugally activated damper assembly as in claim 2, wherein said centrifugal activated valve further comprises a second fluid pathway connected between said first hydraulic chamber of said second damper and said second hydraulic chamber of said first damper.

4. A centrifugally activated damper assembly as in claim 3, wherein said centrifugal activated valve interconnects said first fluid pathway and said second fluid pathway.

5. A centrifugally activated damper assembly as in claim 4, wherein said centrifugal activated valve causes a restriction of flow of said fluid between said first fluid pathway and said second fluid pathway as a result of decreased inertial forces on said centrifugal activated valve, and said centrifugal activated valve causing fluid communication between said first fluid pathway and said second fluid pathway as a result of increased inertial forces on said centrifugal activated valve.

6. A centrifugally activated damper assembly as in claim 1, wherein said centrifugal activated valve further comprises a housing forming a path adapted to receive said centrifugal activated valve and a spring member for biasing said centrifugal activated valve along said path in the direction opposite the response to inertial forces on said centrifugal activated valve.

7. A damper assembly useful in a dual hydraulic damper system controlled by a centrifugal valve therein, comprising:
  a. a rotating member;
  b. first and second dampers containing hydraulic fluid therein operably connected to said rotating member for rotation therewith; and
  c. first and second damper pistons axially moveable in said first and second dampers respectively and operatively interconnected to said centrifugal valve to dampen axial movement of said first and second damper pistons in response to such rotational movement of said rotating member.

8. A damper assembly as in claim 7, further comprising a housing defining a valve chamber wherein said centrifugal valve is retained for relative movement along said chamber between a first closed position and a second open position opposite said first closed position.

9. A damper assembly as in claim 8, further comprising a biasing member disposed within said valve chamber for biasing said centrifugal valve into said first closed position on the basis of the rotational speed of said rotating member.

10. A damper assembly as in claim 7, further comprising a piston rod disposed within said first damper and a second piston rod disposed within said second damper, said first and second piston rods having a first end portion and a second end portion opposite said first end portion, said first end portion of said first piston rod attached to said first damper piston and said first end portion of said second piston rod attached to said second damper piston, said second portion of said first and second piston rod projecting out of said first and second dampers respectively, said first and second piston rod being axially displaceable with said first and second damper pistons respectively.

11. A damper assembly as in claim 8, further comprising a first hydraulic conduit and a second hydraulic conduit for interconnecting said first and second dampers, said first and second hydraulic conduits further interconnected at said centrifugal valve whereby the supply of hydraulic fluid between said first and second hydraulic conduit is interrupted in accordance with said open or closed position of said centrifugal valve.

12. A damper assembly as in claim 11, wherein said first and second dampers further comprises two liquid chambers separated by said damper piston for generating damping force during axial movement of said damper piston.

13. Apparatus for dampening teetering motions of the hub of a rotor assembly which has a plurality of blades secured to the hub which is mounted on a rotatable yoke, comprising:
  a. dampers connected to the hub and to the yoke; and
  b. a centrifugal activated valve disposed about said yoke, said centrifugal activated valve associated with said dampers and operative between first and second position in response to centrifugal forces upon said centrifugal activated valve, said dampers operating in a higher damping mode in said first position, and in a lower damping mode in said second position.

14. Apparatus for dampening teetering motions as set forth in claim 13, wherein said yoke is attached to a rotatable shaft, with the rotational axis of said yoke essentially co-axial to the rotational axis of said shaft.

15. Apparatus for dampening teetering motions as set forth in claim 14, wherein said centrifugal activated valve includes an axis of travel from said first position to said second position, said axis being substantially perpendicular to said axis of said yoke.

16. Apparatus for dampening teetering motions as set forth in claim 13, further comprising a biasing member for biasing said centrifugal activated valve in said first position.

17. Apparatus for dampening teetering motions as set forth in claim 13, wherein said hydraulic dampers include an internal first and second chamber separated by a damper piston adapted to travel within said damper and including a piston rod extending externally to said damper for attachment to said hub.

18. Apparatus for dampening teetering motions as set forth in claim 17, further comprising conduits putting each of said chambers in communication with said chambers of at least one other damper when said centrifugal valve is in said second position and a viscous material within said chambers and conduits so as to produce a damping effect in said dampers when viscous material is restricted from flowing from one chamber to the other.

19. Apparatus for dampening teetering motions as set forth in claim 18, wherein each of said first chamber of each damper is in communication with said second chamber of at least one other damper through said fluid conduit when said centifugal activated valve is in said first position.

20. Apparatus for dampening teetering motions as set forth in claim 18, wherein each of said second chamber of each damper is in communication with said first chamber of at least one other damper through said fluid conduit when said centrifugal activated valve is in the second position.

* * * * *